(12) United States Patent
Suzuki

(10) Patent No.: US 10,087,014 B2
(45) Date of Patent: Oct. 2, 2018

(54) PALLET CONVEYING APPARATUS

(71) Applicant: NITTOKU ENGINEERING CO., LTD., Saitama (JP)

(72) Inventor: Ikuo Suzuki, Fukushima (JP)

(73) Assignee: NITTOKU ENGINEERING CO., LTD., Saitama (JP)

( * ) Notice: Subject to any disclaimer, the term of this patent is extended or adjusted under 35 U.S.C. 154(b) by 0 days.

(21) Appl. No.: 15/551,587

(22) PCT Filed: Feb. 9, 2016

(86) PCT No.: PCT/JP2016/053838
§ 371 (c)(1),
(2) Date: Aug. 16, 2017

(87) PCT Pub. No.: WO2016/132972
PCT Pub. Date: Aug. 25, 2016

(65) Prior Publication Data
US 2018/0044117 A1  Feb. 15, 2018

(30) Foreign Application Priority Data

Feb. 16, 2015 (JP) ................................ 2015-027207

(51) Int. Cl.
| | |
|---|---|
| *B65G 15/24* | (2006.01) |
| *B65G 35/06* | (2006.01) |
| *B23Q 41/02* | (2006.01) |
| *B23Q 7/00* | (2006.01) |

(52) U.S. Cl.
CPC ............... *B65G 35/06* (2013.01); *B23Q 7/00* (2013.01); *B23Q 41/02* (2013.01)

(58) Field of Classification Search
CPC ....................................................... B65G 35/06
See application file for complete search history.

(56) References Cited

U.S. PATENT DOCUMENTS

2011/0100783 A1  5/2011  Baba

FOREIGN PATENT DOCUMENTS

| | | |
|---|---|---|
| JP | 2011-093032 A | 5/2011 |
| JP | 2011-256011 A | 12/2011 |

*Primary Examiner* — Gene O Crawford
*Assistant Examiner* — Lester Rushin, III
(74) *Attorney, Agent, or Firm* — Rabin & Berdo, P.C.

(57) ABSTRACT

A pallet conveying apparatus includes a first and a second guide rails separated in a vertical direction, an endless first circulation belt provided along the first and second guide rails, a first pallet feeding part configured to convey the pallet by rotating the first circulation belt engaged with the pallet, and a first pallet moving part provided at one end sides of the first and second guide rails, wherein the pallet is engaged with an upper side of the first circulation belt when moving along the first guide rail provided on a vertically upper side while being engaged with a lower side of the first circulation belt when moving along the second guide rail provided on a vertical lower side.

10 Claims, 10 Drawing Sheets

PALLET CONVEYING APPARATUS

TECHNICAL FIELD

The present invention relates to a pallet conveying apparatus for conveying a plurality of pallets, which carry works, with respect to a work station.

BACKGROUND ART

Conventionally, a pallet conveying apparatus is known which mounts works to be processed on pallets and conveys pallets together with the works in a manufacturing line. In the pallet conveying apparatus, a machine tool in a processing station at a conveyance destination performs a predetermined processing on the works mounted on the pallets. The present applicant proposed a pallet conveying apparatus for conveying a plurality of pallets carrying works with respect to a processing station along a rectangular track (see, for example, JP2011-93032A).

In this pallet conveying apparatus, a toothed belt in which recesses and projections are alternately connected in a longitudinal direction is provided along a rail, on which the pallets are movably mounted, and projections and recesses engageable with these recesses and projections are formed on the pallets. This pallet conveying apparatus is structured to convey the pallets by circulating the toothed belt with the projections and recesses of the pallets engaged with the recesses and projections of the toothed belt.

The pallet conveying apparatus having such a structure conveys the pallets along the rectangular track. When the toothed belt is circulated, the projections and recesses formed on the pallets are engaged with arbitrary recesses and projections of the toothed belt. Thus, a work conveying speed and positioning accuracy can be enhanced while preventing displacements of the pallets with respect to the toothed belt, and it can be expected to be able to easily change a pallet conveying pitch.

SUMMARY OF INVENTION

However, in the pallet conveying apparatus as described above for conveying the pallets along the rectangular track, a separate circulation belt for returning the pallets needs to be provided in addition to a circulation belt for conveying the pallets in one direction. This pallet conveying apparatus needs to include drive means for separately circulating the circulation belt for each of the two circulation belts. Thus, a plurality of circulation belts and a plurality of drive means are inevitably necessary, thereby presenting problems that a unit price (manufacturing cost) of the pallet conveying apparatus is pushed up and the pallet conveying apparatus is enlarged.

The present invention was developed in view of the above problems and aims to provide a pallet conveying apparatus capable of omitting an independent circulation belt for returning pallets.

A pallet conveying apparatus includes a first and a second guide rails separated in a vertical direction, the first and second guide rails being configured such that a pallet is movably mountable thereon, an endless first circulation belt provided along the first and second guide rails, recesses and projections engageable with the pallet being formed on one principal surface of the first circulation belt, a first pallet feeding part configured to convey the pallet by rotating the first circulation belt engaged with the pallet, and a first pallet moving part provided at one end sides of the first and second guide rails, the first pallet moving part moving the pallet from one of the first and second guide rails to the other, the pallet being engaged with an upper side of the first circulation belt when moving along the first guide rail provided on a vertically upper side while being engaged with a lower side of the first circulation belt when moving along the second guide rail provided on a vertical lower side.

The pallet conveying apparatus may further include a third and a fourth guide rails separated in the vertical direction to be respectively on the same planes as the first and second guide rails, the third and fourth guide rails being configured such that the pallet is movably mountable thereon, an endless second circulation belt provided along the third and fourth guide rails, recesses and projections engageable with the pallet being formed on one principal surface of the second circulation belt, a second pallet feeding part configured to convey the pallet by rotating the second circulation belt engaged with the pallet, and a second pallet moving part provided at one end sides of the third and fourth guide rails, the second pallet moving part moving the pallet from one guide rail to the other. In this case, the pallet is engaged with an upper side of the second circulation belt when moving along the third guide rail provided on the vertically upper side, while being engaged with a lower side of the second circulation belt when moving along the fourth guide rail provided on the vertical lower side.

DESCRIPTION OF EMBODIMENTS

Hereinafter, one embodiment of the present invention is described with reference to the accompanying drawings.

Figure 1:
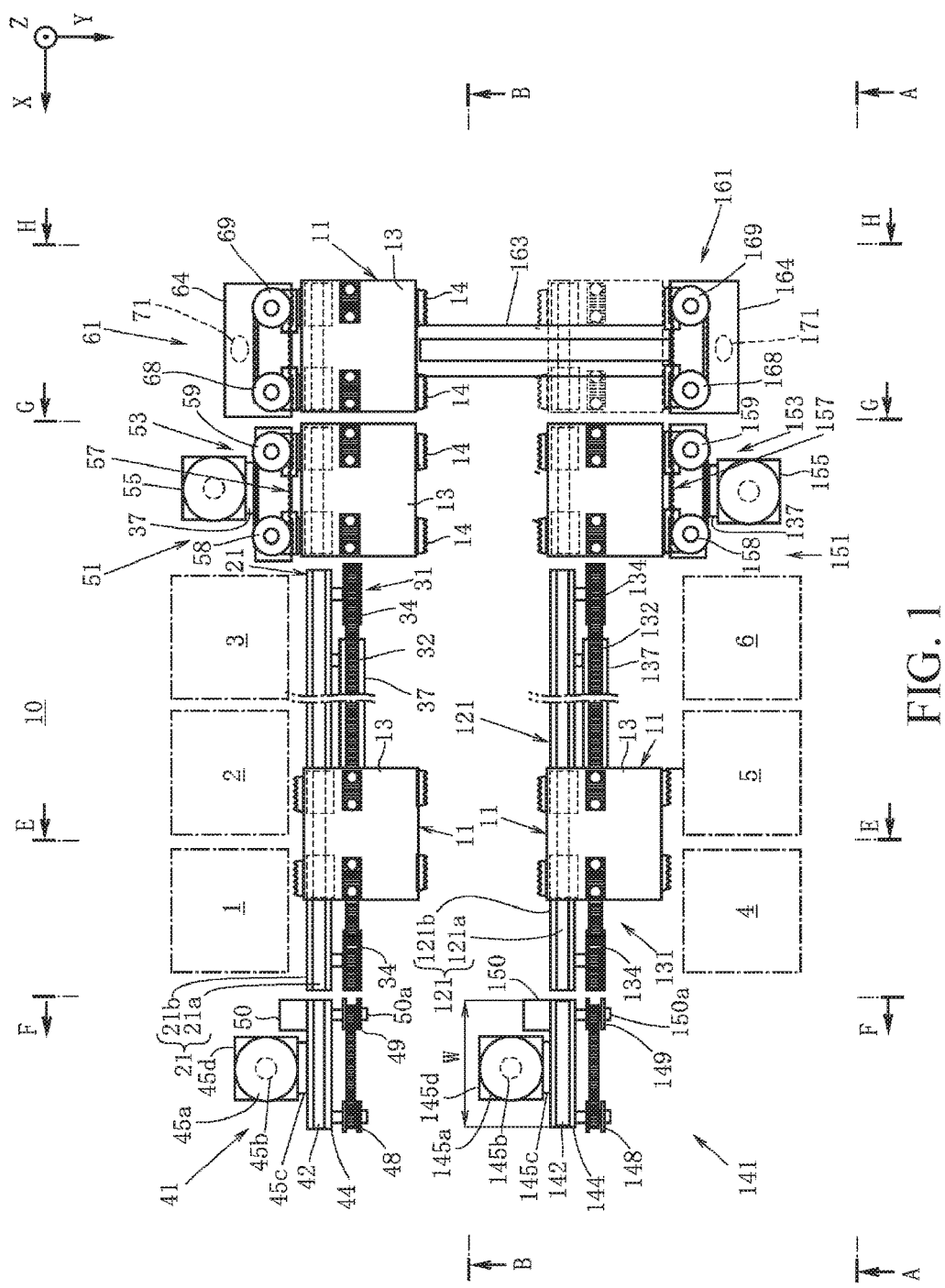
FIG. 1 is a top view showing a pallet conveying apparatus in one embodiment of the present invention.
Figure 2:
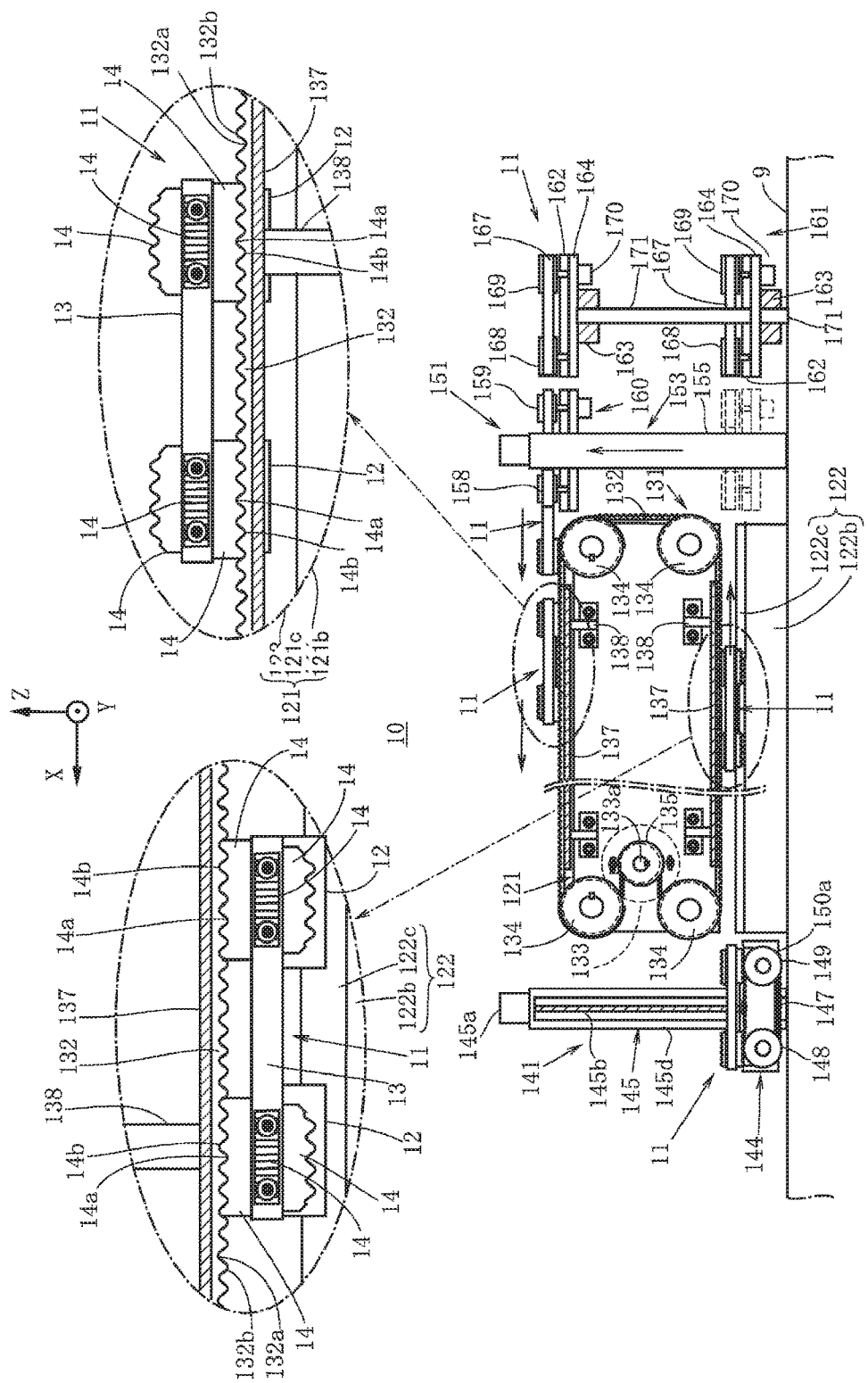
FIG. 2 is an arrow view along line A-A of FIG. 1.
Figure 3:
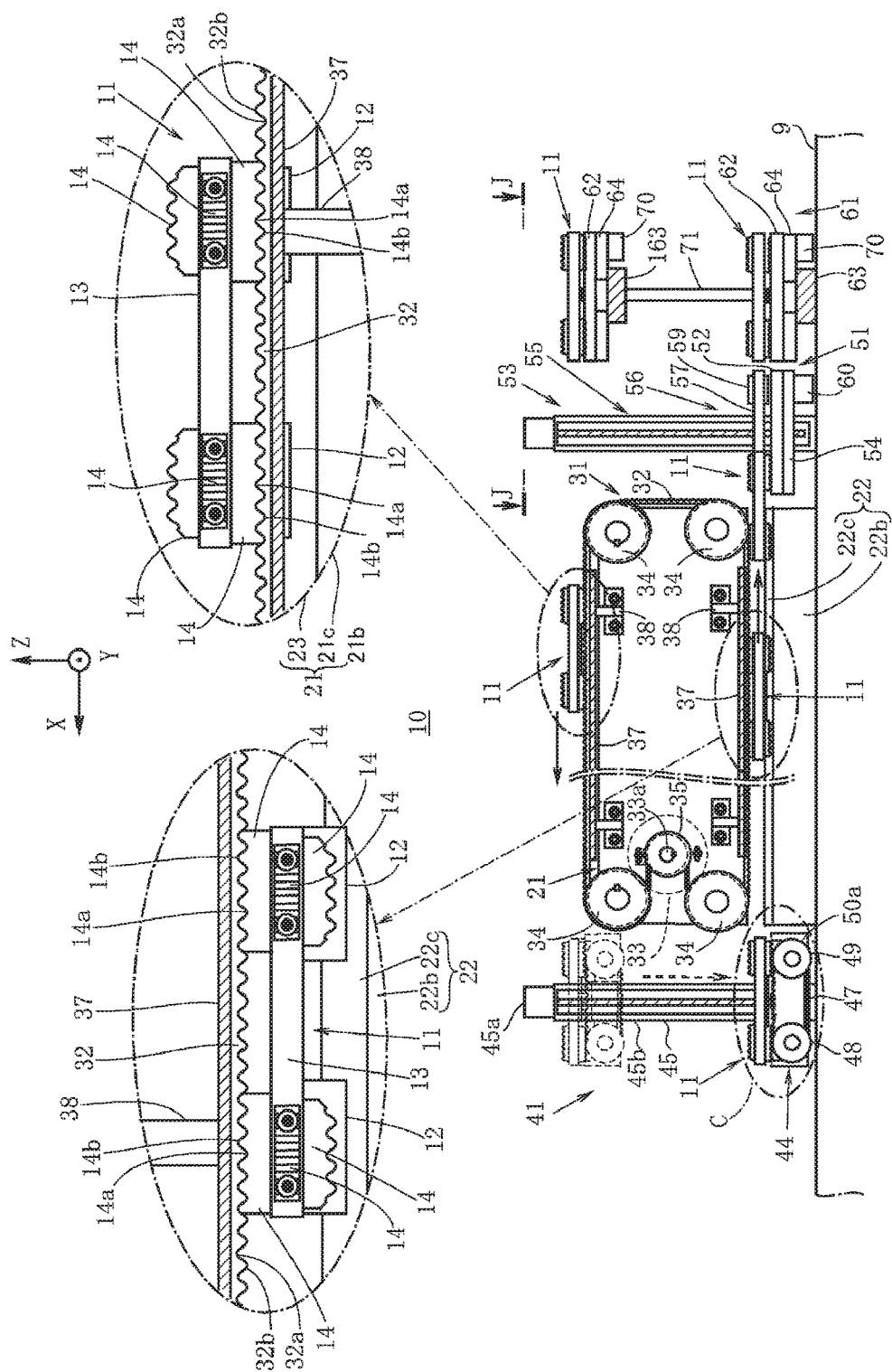
FIG. 3 is a sectional view along line B-B of FIG. 1.

FIGS. 1 to 3 show a pallet conveying apparatus 10 in one embodiment of the present invention. FIG. 1 is a top view of the pallet conveying apparatus 10, FIG. 2 is an arrow view along line A-A of FIG. 1, and FIG. 3 is a sectional view along line B-B of FIG. 1. In each figure, three axes of X, Y and Z perpendicular to each other are set, wherein it is assumed that an X axis extends substantially in a horizontal lateral direction, a Y axis extends substantially in a horizontal front-back direction and a Z axis extends in a vertical direction. The configuration of the pallet conveying apparatus 10 is described below using X, Y and Z directions.

The pallet conveying apparatus 10 of the present embodiment conveys a pallet 11 carrying a work, stops the pallet 11 before machine tools 1 to 6 (see FIG. 1) installed along a conveyance path thereof, and holds the work carried on that pallet 11 at predetermined positions. The pallet conveying apparatus 10 is used such as in the case of processing the work carried on the pallet 11 by those machine tools 1 to 6.

It should be noted that the number of machine tools 1 to 6 (see FIG. 1) differs depending on the content of works required to be processed, and the number of the pallets 11 conveyed at one time may be appropriately increased or decreased according to the number of the machine tools 1 to 6.

As shown in FIGS. 2 and 3, the pallet conveying apparatus 10 of the present embodiment includes a plurality of guide rails 21, 22, 121 and 122 for movably mounting the pallets 11. The plurality of guide rails 21, 22, 121 and 122 include a first guide rail 21, a second guide rail 22, a third guide rail 121 and a fourth guide rail 122.

Figure 4:
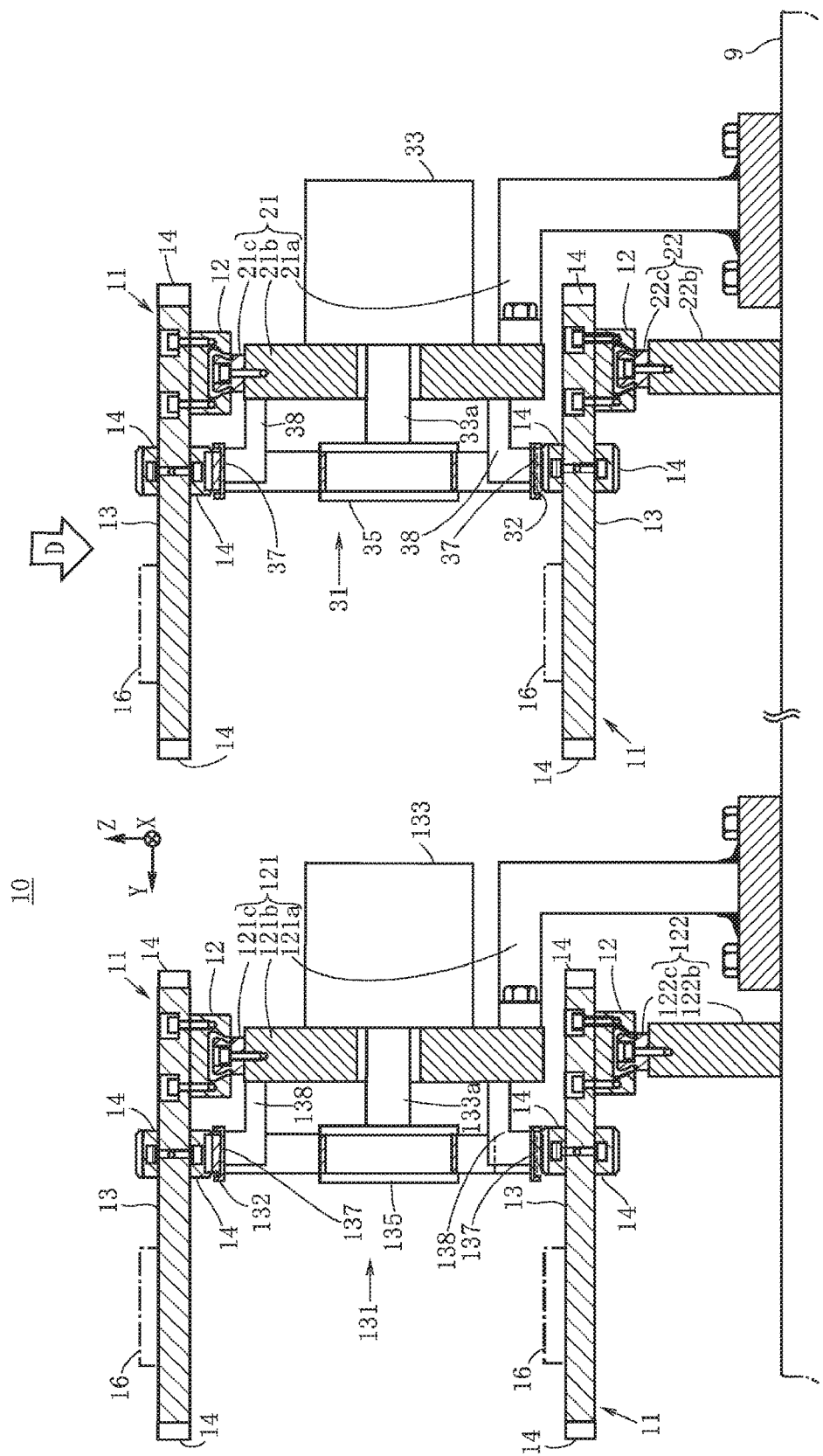
FIG. 4 is a sectional view along line E-E of FIG. 1.

As shown in FIG. 4, a case where the pallet conveying apparatus 10 includes the first and third guide rails 21, 121 separated in the Y-axis direction and extending in parallel to each other in the X-axis direction and the second and fourth guide rails 22, 122 at a predetermined interval in the Z-axis direction from the first and third guide rails 21, 121 and provided in parallel to each other is shown in the present embodiment.

It should be noted that, in the first to fourth guide rails 21, 22, 121 and 122, a positional relationship of the first and second guide rails 21, 22 or a positional relationship of the third and fourth guide rails 121, 122 is an upper-and-lower positional relationship if the Z-axis direction of FIG. 1 is a vertical direction. Further, if the Y-axis direction is a facing direction, the first or second guide rail 21, 22 and the third or fourth guide rail 121, 122 are positioned on one side and on the other side. As just described, the first and third guide rails 21, 121 are provided substantially on the same plane and the second and fourth guide rails 22, 122 are provided substantially on the same plane.

In the present embodiment, the first guide rail 21 may be referred to as an "upper position on the one side", the second guide rail 22 as a "lower position on the one side", the third guide rail 121 as an "upper position on the other side" and the fourth guide rail 122 as a "lower position on the other side". Further, the first and second guide rails 21, 121 may be referred to as an "upper position" and the second and fourth guide rails 22, 122 as a "lower position".

Each of the second and fourth guide rails 22, 122 located below is for mounting the pallets 11 in a horizontal state. The second and fourth guide rails 22, 122 respectively include second and fourth supporting plates 22b, 122b directly fixed on a mount 9 and commercially available second and fourth linear motion guide rails 22c, 122c fixed to the upper edges of the second and fourth supporting plates 22b, 122b by screwing.

The first and third guide rails 21, 121 located above are for mounting the pallets 11 in a horizontal state similarly to the second and fourth guide rails 22, 122. The first and third guide rails 21, 121 respectively include first and third supporting plates 21b, 121b provided side by side above the second and fourth supporting plates 22b, 122b via brackets 21a, 121a fixed onto the mount 9 and commercially available first and third linear motion guide rails 21c, 121c fixed to the upper edges of the first and third supporting plates 21b, 121 by screwing.

The first and third guide rails 21, 121 and the second and fourth guide rails 22, 122 are separated in the Y-axis direction at an interval larger than a length of each pallet 11 in the Y-axis direction, and respectively provided to extend in the X-axis direction in parallel to each other.

Here, the first to fourth linear motion guide rails 21c, 22c, 121c and 122c of the first to fourth guide rails 21, 22, 121 and 122 have the same shape. Thus, even if the pallet 11 mounted on any one of the first to fourth guide rails 21, 22, 121 and 122 is moved to and mounted on the other guide rail 21, 22, 121 or 122, that pallet 11 is movable on this other guide rail 21, 22, 121 or 122.

Figure 5:
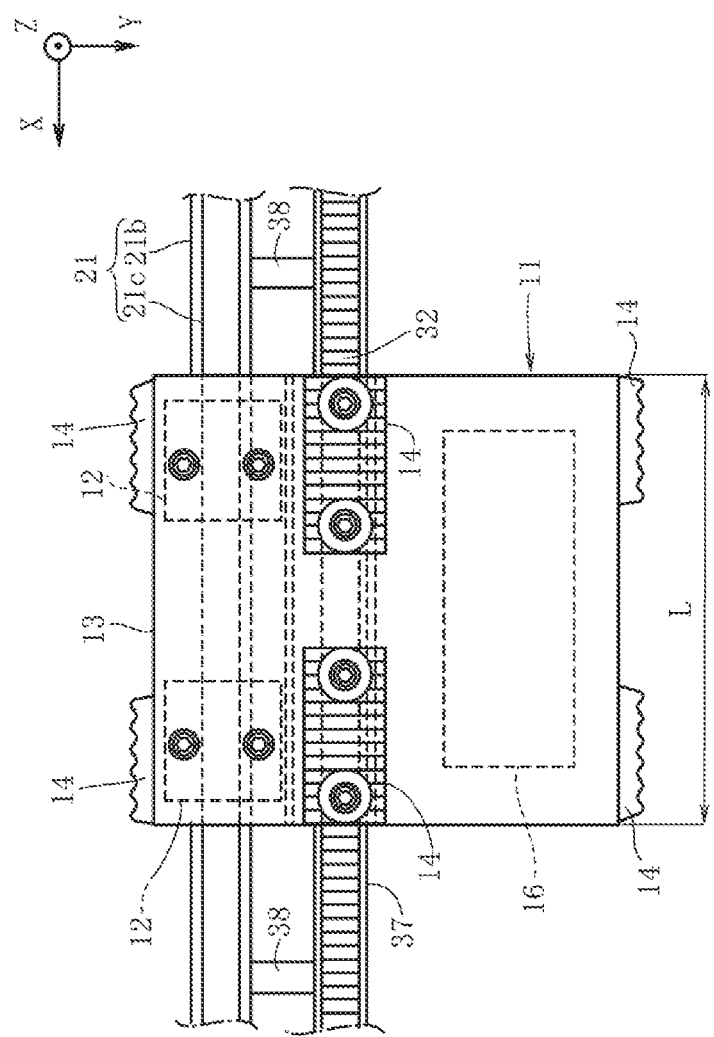
FIG. 5 is a top view of a pallet viewed along an arrow D of FIG. 4.

On the other hand, as shown in FIGS. 4 and 5, the pallet 11 includes a linear motion block 12 configured to be movable on the corresponding first to fourth guide rail 21, 22, 121 and 122 across the respective linear motion guide rails 21c, 22c, 121c and 122c, a pedestal 13 screwed to the linear motion block 12 and a plurality of locking members 14 provided on the pedestal 13.

The linear motion block 12 may be a commercially available one sold together with the linear motion guide rails 21c, 22c, 121c and 122c and preferably includes an unillustrated roller retainer. By using the linear motion block 12 including this roller retainer, resistance caused by friction when the pallet 11 moves on the first to fourth guide rails 21, 22, 121 and 122 can be drastically reduced while a movement of the linear motion block 12 in a width direction (Y-axis direction) and the inclination thereof with respect to each linear motion guide rail 21c, 22c, 121c, 122c are prohibited.

It is assumed that a mounting tool 16 for mounting an unillustrated work is provided on one lateral part of the pedestal 13. This mounting tool 16 is provided on the pedestal 13 and stably mounts the unillustrated work on the pedestal 13. This mounting tool 16 is used with the structure thereof appropriately changed depending on the type of works to be mounted on the pallet 11 and processed.

The linear motion block 12 is fixed to the other lateral part of the pedestal 13. The locking members 14 are respectively provided on both principal surfaces of the pedestal 13 between this linear motion block 12 and the mounting tool 16 and both side surfaces of the pedestal 13 in the Y-axis direction. Here, in the present embodiment, the locking members 14 provided on the both principal surfaces of the pedestal 13 may be referred to as first locking members 14 and the locking members 14 provided on the both side surfaces of the pedestal 13 as second locking members 14.

As just described, the pallet 11 is movably mounted in a horizontal state on each guide rail 21, 22, 121 and 122 by movably supporting the linear motion block 12 to straddle any one of the corresponding first to fourth linear motion guide rails 21c, 22c, 121c and 122c of the first to fourth guide rails 21, 22, 121 and 122. It should be noted that the locking members 14 are described in detail later.

Referring back to FIGS. 1 to 3, the pallet conveying apparatus 10 includes first and second pallet feeding parts 31, 131 for conveying (moving) the pallets 11 respectively mounted on the first to fourth guide rails 21, 22, 121 and 122 along the guide rails 21, 22, 121 and 122.

The first pallet feeding part 31 provided to correspond to the first and second guide rails 21, 22 has the same structure as the second pallet feeding part 131 provided to correspond to the third and fourth guide rails 121, 122.

Specifically, the first pallet feeding part 31 includes an endless first circulation belt 32 provided along the first and second guide rails 21, 22 and configured to circulate in a predetermined direction, and a first circulating mechanism 33 for circulating the first circulation belt 32. Further, the second pallet feeding part 131 includes an endless second circulation belt 132 provided along the third and fourth guide rails 121, 122 and configured to circulate in a predetermined direction, and a second circulating mechanism 133 for circulating the second circulation belt 132.

As shown in FIGS. 2 and 3, at least two supporting columns (not shown) are provided on each of the second and fourth supporting plates 22b, 122b of the second and fourth guide rails 22, 122, and four driven pulleys 34, 134 are rotatably supported via these supporting columns. Each of the first and second circulation belts 32, 132 is mounted to enclose these four driven pulleys 34, 134.

Further, as shown in FIG. 4, servo motors 33, 133, which are first and second circulating mechanisms for circulating the first or second circulation belt 32, 132, are respectively provided on the first and third supporting plates 21b, 121b. Drive pulleys 35, 135 are respectively provided on rotary shafts 33a, 133a of the servo motors 33, 133. The drive pulley 35, 135 is provided on the same plane as the corresponding four driven pulleys 34, 134. The servo motors 33, 133 are mounted on the first and second supporting plates 21b, 121b to turn the first or second circulation belt 32, 132 between a pair of vertically adjacent driven pulleys 34, 134 on one side and mount the first or second circulation belt 32, 132 on the drive pulleys 35, 135.

When the servo motors 33, 133 are driven by a command from an unillustrated controller, the rotary shafts 33a, 133a rotate together with the drive pulleys 35, 135. The first or second circulation belt 32, 132 mounted on the drive pulleys 35, 135 circulates while enclosing the four driven pulleys 34, 134.

The first and second circulation belts 32, 132 provided to correspond to the first and second pallet feeding parts 31, 131 are so-called toothed belts having the same structure.

The first and second circulation belts 32, 132 are such belts that recesses and projections 32a, 32b, 132a, 132b, which are trough and crest parts extending in the width direction, are alternately connected in a longitudinal direction as shown in each enlarged view of FIGS. 2 and 3. The pallet 11 is formed with projections and recesses 14a, 14b engageable with the recesses and projections 32a, 32b, 132a, 132b. The projections and recesses 14a, 14b are formed on the first locking members 14 constituting the pallet 11.

The first locking members 14 are respectively provided on the both principal surfaces of the pedestal 13. If the pallet 11 is mounted on the second or fourth guide rail 22, 122 located on a vertically lower side, the first locking members 14 provided on an upper side of the pedestal 13 are engaged with the first or second circulation belt 32, 132. On the other hand, if the pallet 11 is mounted on the first or third guide rail 21, 121 located on a vertically upper side, the first locking members 14 provided on a lower side of the pedestal 13 are engaged with the first or second circulation belt 32, 132 similarly to the linear motion block 12. As just described, the driven pulleys 34, 134 are provided at four corners of the second supporting plates 22b, 122b to circulate the first and second circulation belts 32, 132.

Thus, the first to fourth guide rails 21, 22, 121 and 122 of this pallet conveying apparatus 10 are configured to include the first and third guide rails 21, 121 provided along the recesses and projections 32a, 32b, 132a, 132b facing in one direction of the first and second circulation belts 32, 132, i.e. facing upward and located on the vertically upper side and the second and fourth guide rails 22, 122 provided along the recesses and projections 32a, 32b, 132a, 132b facing in a direction opposite to the one direction, i.e. facing downward in the present embodiment and located on the vertically lower side.

When the first locking members 14 of the pallet 11 come into contact with the first or second circulation belt 32, 132, the recesses and projections 32a, 32b, 132a, 132b formed on the first or second circulation belt 32, 132 are engaged with the projections and recesses 14a, 14b formed on the first locking members 14. Further, when the first or second circulation belt 32, 132 sinks to be separated from the first locking members 14 along the driven pulley 34, 134, the recesses and projections 32a, 32b, 132a, 132b of the first or second circulation belt 32, 132 and the projections and recesses 14a, 14b of the first locking members 14 are disengaged. The pallet conveying apparatus 10 of the present embodiment is configured as just described.

Here, as shown in FIGS. 2 and 3, first and second supporting members 37, 137 for preventing the slack of the first and second circulation belts 32, 132 and the separation of the first and second circulation belts 32, 132 from the first locking members 14 are provided between the upper two driven pulleys 34, 134 and between the lower two driven pulleys 34, 134. The first and second supporting members 37, 137 are mounted on the second supporting plates 22b, 122b via attachments 38, 138.

As shown in the enlarged views of FIGS. 2 and 3, when the projections and recesses 14a, 14b of the first locking members 14 are engaged with the recesses and projections 32a, 32b, 132a, 132b of the first or second circulation belt 32, 132, a movement of the pallet 11 in the X-axis direction independent of the rotation of the first or second circulation belt 32, 132 is prohibited. Thus, when the first or second circulation belt 32, 132 having the pallet 11 engaged therewith is circulated, the pallet 11 moves together with the first or second circulation belt 32, 132. In this way, the pallet 11 is conveyed along the first to fourth guide rail 21, 22, 121, 122 adjacent to the first or second circulation belt 32, 132.

In the present embodiment, when the first or second circulation belt 32, 132 is circulated, the pallet 11 mounted on the first or third guide rail 21, 121 located on the vertically upper side and the pallet 11 mounted on the second or fourth guide rail 22, 122 located on the vertically lower side simultaneously move at the same speed in directions opposite to each other as shown by solid-line arrows of FIGS. 2 and 3.

As shown in FIGS. 1 to 3, first and second pallet moving parts 41, 141 are respectively provided at one end parts of the first to fourth guide rails 21, 22, 121 and 122 provided in parallel to each other. Further, third and fourth pallet moving parts 51, 151 are respectively provided at the other end parts of the first to fourth guide rails 21, 22, 121 122. Fifth pallet moving parts 61, 161 are respectively provided at end parts of the third and fourth pallet moving parts 51, 151 opposite to the first to fourth guide rails 21, 22, 121 122.

The first and second pallet moving parts 41, 141 provided at the one end parts of the first to fourth guide rails 21, 22, 121 122 lower the pallet 11 mounted on the first or third guide rail 21, 121 located above to the second or fourth guide rail 22, 122 located on the vertically lower side. Further, conversely, the first and second pallet moving parts 41, 141 may lift the pallet 11 mounted on the second or fourth guide rail 22, 122 to the first or third guide rail 21, 121. It should be noted that the first and second pallet moving parts 41, 141 have the same structure.

Figure 7:
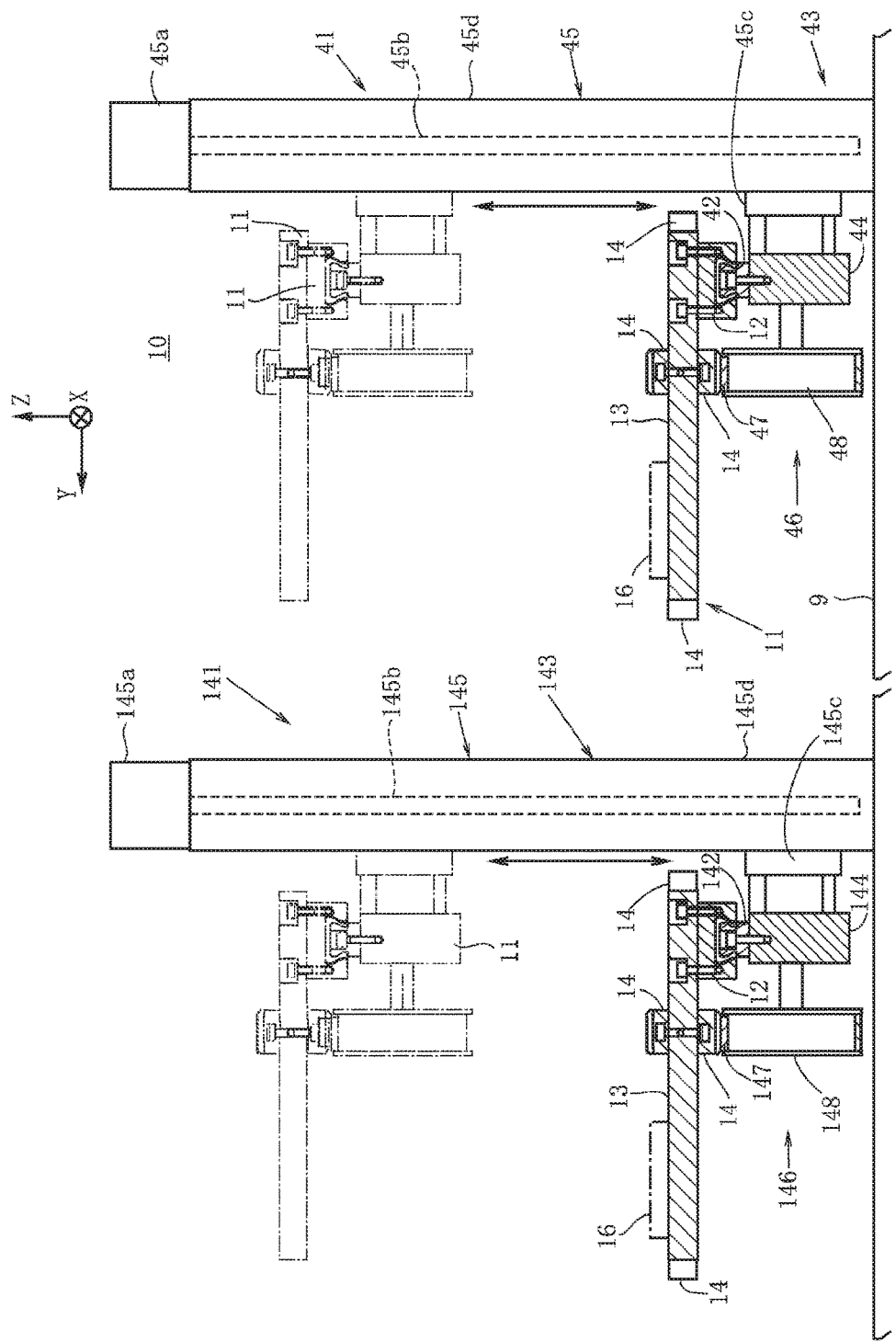
FIG. 7 is a sectional view along line F-F of FIG. 1.

As shown in FIG. 7, the first and second pallet moving parts 41, 141 in the present embodiment respectively include first and second short rails 42, 142 configured such that the pallet 11 is mountable thereon and first and second rail moving mechanisms 43, 143 for moving the first and second short rails 42, 142 upward or downward between an upper first position and a lower second position. The first position is a position connected to (on the same plane as) the first or third linear motion guide rail 21c, 121c of the first or third guide rail 21, 121. Further, the second position is a position connected to (on the same plane as) the second or fourth linear motion guide rail 22c, 122c of the second or fourth guide rail 22, 122.

The same rails as the linear motion guide rails 21c, 22c, 121c 122c of the first to fourth guide rails 21, 22, 121 122 are used as the first and second short rails 42, 142. A length W (see FIG. 1) of the first or second short rail 42, 142 in the X-axis direction is equal to or longer than a length L (see FIG. 5) of the pallet 11 in the X-axis direction.

The first or second short rail 42, 142 is configured to make the pallet 11 movable between the first or second short rail 42, 142 and the linear motion guide rail 21c, 22c, 121c, 122c when the first or second short rail 42, 142 is connected to the linear motion guide rail 21c, 22c, 121c, 122c of the first to fourth guide rail 21, 22, 121, 122. Specifically, the pallet 11 separated from the first or second circulation belt 32, 132 and moved from the linear motion guide rail 21c, 22c, 121c, 122c is mounted on the first or second short rail 42, 142. Further, the first or second short rail 42, 142 is configured to make the pallet 11 mounted thereon movable to the linear motion guide rail 21c, 22c, 121c, 122c.

As shown in FIGS. 1 to 3 and 7, the first and second rail moving mechanisms 43, 143 for vertically moving such first and second short rails 42, 142 include first and second supporting plates 44, 144 (see FIG. 1 or 7) having the first and second short rails 42, 142 respectively mounted on upper edges, and first and second Z-axis direction telescopic actuators 45, 145 for moving the first and second supporting plates 44, 144 in the Z-axis direction with respect to the mount 9.

Each of the first and second Z-axis direction telescopic actuators 45, 145 is composed of a long and narrow box-shaped housing 45d, 145d, a ball screw 45b, 145b provided to extend in a longitudinal direction inside the housing 45d, 145b and to be rotationally driven by servo motors 45a, 145a, a follower 45c, 145c threadably engaged with the ball screw 45b, 145b and configured to parallelly move, and the like.

The first and second Z-axis direction telescopic actuators 45, 145 are configured such that the follower 45c, 145c threadably engaged with the ball screw 45b, 145b is movable along the longitudinal direction (vertical direction) of the housing 45d, 145d when the servo motor 45a, 145a is driven to rotate the ball screw 45b, 145b.

In the present embodiment, the first and second supporting plates 44, 144 provided with the first or second short rail 42, 142 are mounted on the followers 45c, 145c of the first and second Z-axis direction telescopic actuators 45, 145 to be movable in the Z-axis direction. The drive of the servo motors 45a, 145a of the first and second telescopic actuators 45, 145 is controlled by the unillustrated controller. Specifically, the servo motors 45a, 145a are connected to the controller, and the first and second rail moving mechanisms 43, 143 are configured to be able to move the first and second short rails 42, 142 upward and downward in the Z-axis direction together with the first and second supporting plates 44, 144 by driving the servo motors 45a, 145a by a command from the controller.

When the first or second short rail 42, 142 is connected to the first to fourth guide rail 21, 22, 121, 122, the pallet 11 moving on the first to fourth guide rail 21, 22, 121, 122 is movable from the first to fourth guide rail 21, 22, 121, 122 to the first or second short rail 42, 142. Thus, the first and second pallet moving parts 41, 141 respectively include first and second pallet locking mechanisms 46, 146 for limiting movements of the pallets 11 mounted on the first and second short rails 42, 142.

The first and second pallet locking mechanisms 46, 146 are configured to be engageable with the pallets 11 mounted on the first and second short rails 42, 142 and respectively include endless first and second auxiliary belts 47, 147 provided to circulate along the first and second short rails 42, 142 and first and second auxiliary circulating mechanisms for circulating the first and second auxiliary belts 47, 147.

Auxiliary pulleys 48, 148 on which the first and second auxiliary belts 47, 147 extending along the first and second short rails 42, 142 are respectively mounted are rotatably supported on one end parts of the first and second supporting plates 44, 144 in the X-axis direction. Further, auxiliary drive pulleys 49, 149 on which the first and second auxiliary belts 47, 147 are respectively mounted are rotatably supported on the other end parts of the first and second supporting plates 44, 144 in the X-axis direction.

The first and second auxiliary circulating mechanisms are composed of servo motors 50, 150 (see FIG. 1) respectively mounted on the first and second supporting plates 44, 144. The auxiliary drive pulleys 49, 149 are mounted on rotary shafts 50a, 150a of the servo motors 50, 150. The auxiliary drive pulleys 49, 149 are provided on the same planes as the auxiliary pulleys 48, 148 and, as shown in FIGS. 2 and 3, the first and second auxiliary belts 47, 147 are mounted on the auxiliary drive pulleys 49, 149 and the auxiliary pulleys 48, 148.

When the servo motors 50, 150 are driven by a command from the unillustrated controller, the first and second auxiliary belts 47, 147 are respectively circulated along the first and second short rails 42, 142 via the auxiliary drive pulleys 49, 149 and the auxiliary pulleys 48, 148.

Figure 6:
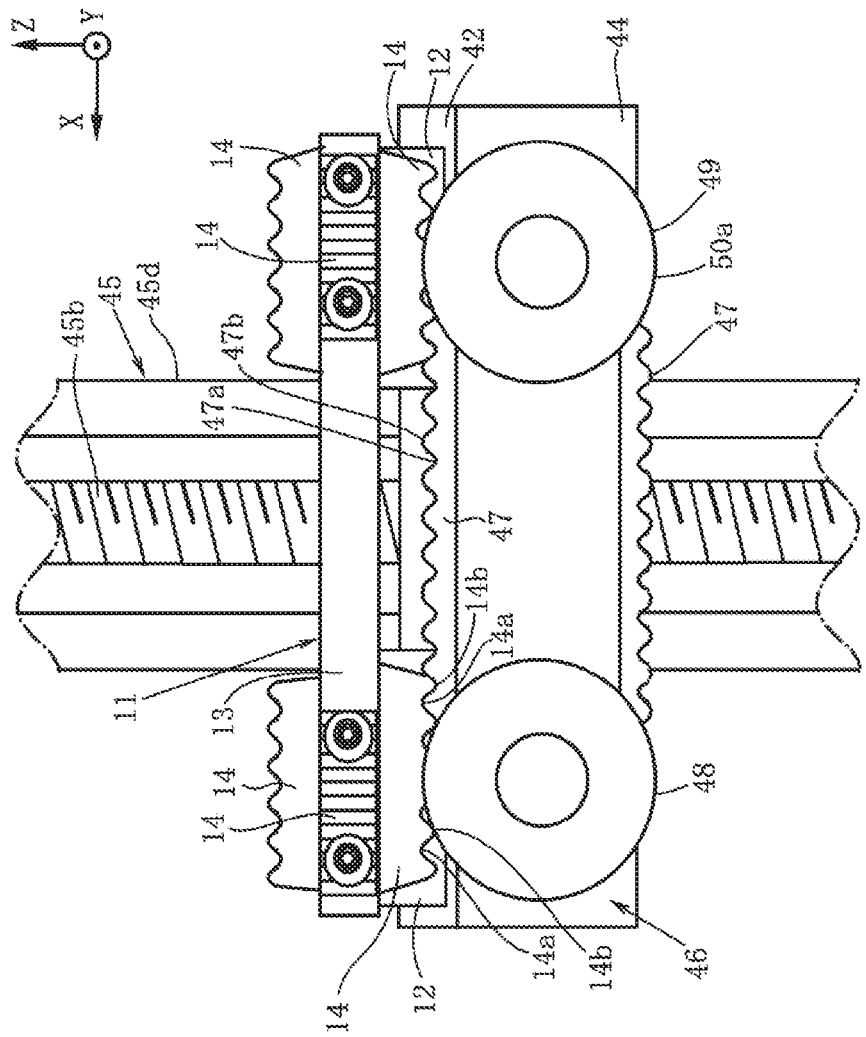
FIG. 6 is an enlarged view of a section C of FIG. 3.

FIG. 6 is an enlarged view of a section C of FIG. 3 and shows the configuration on the side of the first short rail 42 in detail as a representative. The auxiliary belt 47 is a belt in which recesses and projections 47a, 47b having the same shapes as the recesses and projections 32a, 32b of the first circulation belt 32 and extending in the width direction are alternately connected. The first auxiliary belt 47 is configured such that the recesses and projections 47a, 47b thereof are engageable with the projections and recesses 14a, 14b formed on the first locking members 14 provided on the same lower side as the linear motion block 12 of the pallet 11 when the pallet 11 is mounted on the first short rail 42. Although not shown, the second auxiliary belt 147 is configured similarly to the first auxiliary belt 47 also on the side of the second short rail 142.

Accordingly, when the first and second circulation belts 32, 132 and the first and second auxiliary belts 47, 147 are circulated at the same speed, the pallets 11 moving on the first and third guide rails 21, 121 or the second and fourth guide rails 22, 122 are movable to the first or second short rail 42, 142 connected to the first to fourth guide rail 21, 22, 121, 122. Further, the pallet 11 mounted on the first or second short rail 42, 142 is lifted or lowered between the first or third guide rail 21, 22 located on the vertically upper side and the second or fourth guide rail 22, 122 located on the vertically lower side.

Referring back to FIGS. 1 to 3, the third and fourth pallet moving parts 51, 151 are respectively provided at the other end parts of the first to fourth guide rails 21, 22, 121 122. The third and fourth pallet moving parts 51, 151 lift or lower the pallet 11 between the first and third guide rails 21, 121 and the second and fourth guide rails 22, 122 similarly to the first and second pallet moving parts 41, 141. However, the third and fourth pallet moving parts 51, 151 are structured differently from the first and second pallet moving parts 41, 141.

Figure 8:
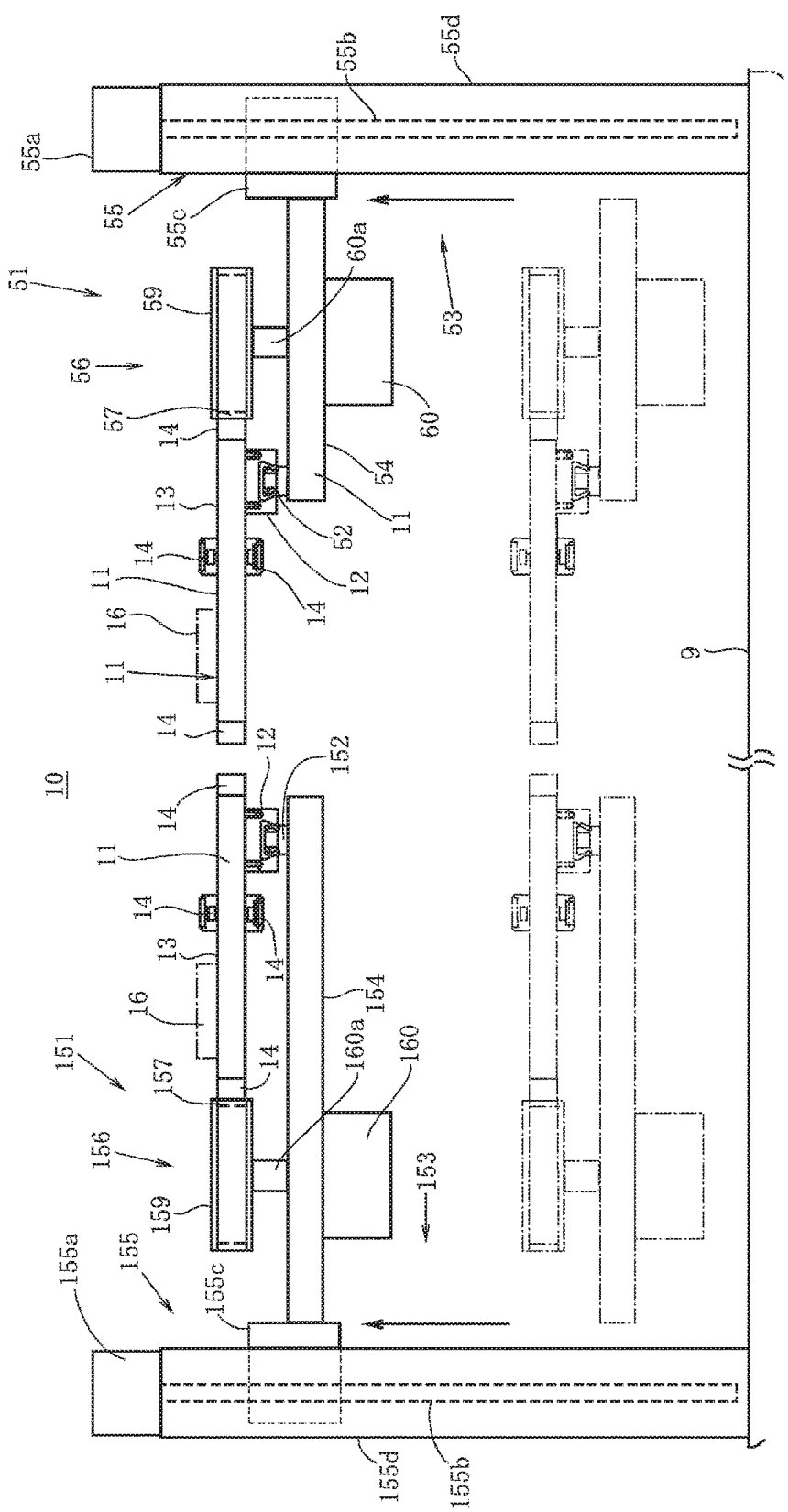
FIG. 8 is a sectional view along line G-G of FIG. 1.
Figure 10:
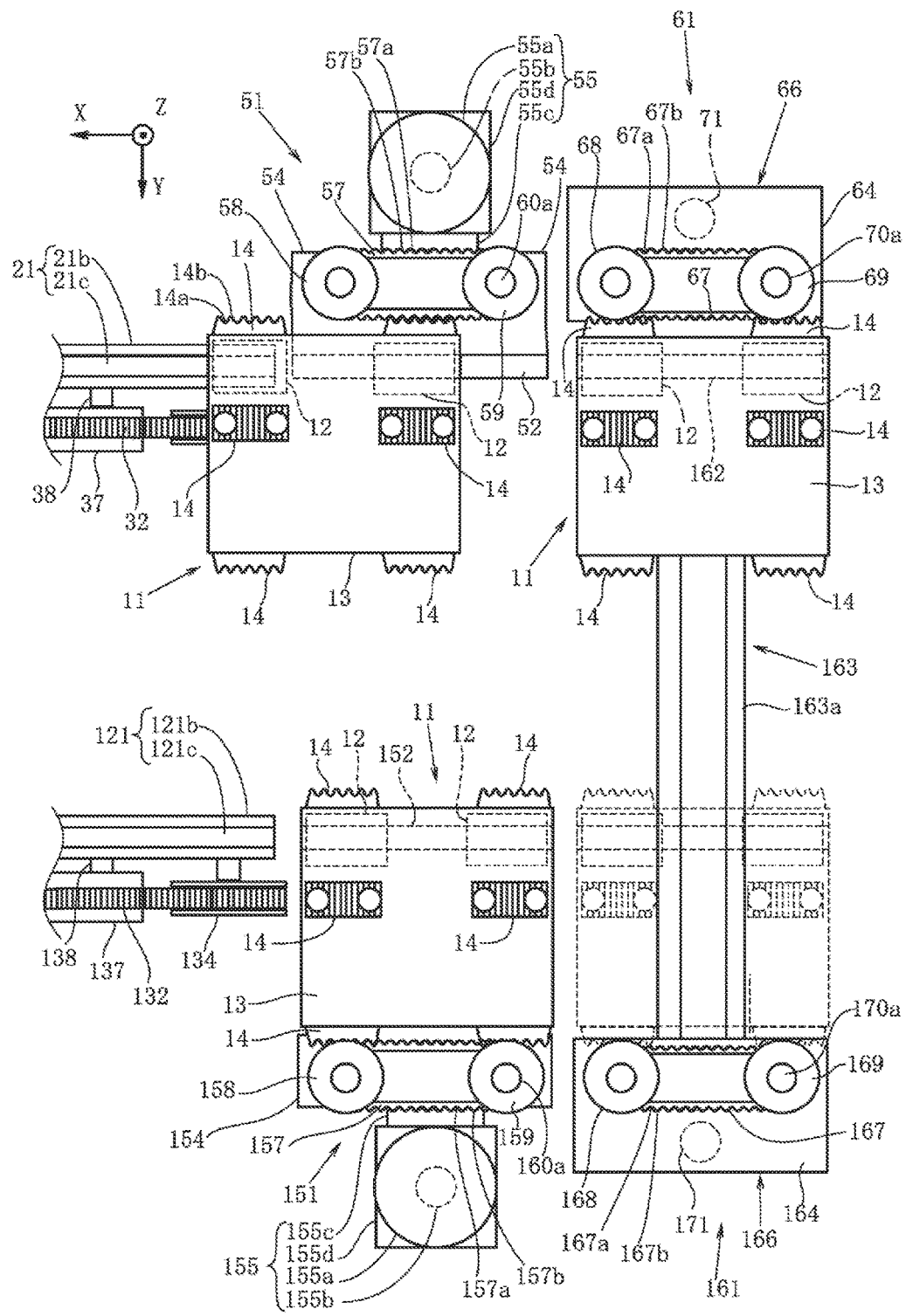
FIG. 10 is a sectional view along line J-J of FIG. 3.

Specifically, as shown in FIGS. 8 and 10, the third and fourth pallet moving parts 51, 151 in the present embodiment respectively include third and fourth short rails 52, 152 configured such that the pallet 11 is mountable thereon, and third and fourth rail moving mechanisms 53, 153 for lowering or lifting the third and fourth short rails 52, 152 between an upper third position and a lower fourth position. The third position is a position connected to (on the same plane as) the first or third linear motion guide rail 21c, 121c of the third or third guide rail 21, 121. Further, the fourth position is a position connected to (on the same plane as) the second or fourth linear motion guide rail 22c, 122c of the second or fourth guide rail 22, 122.

The third and fourth short rails 52, 152 have the same structure as the first or second short rail 42, 142 of the first and second pallet moving parts 41, 141. When the third and fourth short rails 52, 152 are connected to the linear motion guide rails 21c, 22c, 121c, 122c of the first to fourth guide rails 21, 22, 121, 122, the pallets 11 are movable between the third and fourth short rails 52, 152 and the linear motion guide rails 21c, 22c, 121c, 122c. Specifically, the pallet 11 separated from the first or second circulation belt 32, 132 and moved from the linear motion guide rail 21c, 22c, 121c, 122c is mounted on the third and fourth short rails 52, 152. Further, the third and fourth short rails 52, 152 move the pallets 11 mounted thereon to the linear motion guide rails 21c, 22c, 121c, 122c.

As shown in FIGS. 1 to 3, 8 and 10, the third and fourth rail moving mechanisms 53, 153 for vertically moving such third and fourth short rails 52, 152 respectively include horizontal third and fourth supporting plates 54, 154 having the third and fourth short rails 52, 152 mounted on end edges, and third and fourth Z-axis direction telescopic actuators 55, 155 for moving the third and fourth supporting plates 54, 154 in the Z-axis direction with respect to the mount 9.

The third and fourth Z-axis direction telescopic actuators 55, 155 have the same configurations as the first and second Z-axis direction telescopic actuators 45, 145 of the first and second pallet moving parts 41, 141. Thus, repeated description is omitted.

In the present embodiment, the third and fourth supporting plates 54, 154 on which the third and fourth short rails 52, 152 are provided are attached to followers 55c, 155c of the third and fourth Z-axis direction telescopic actuators 55, 15 to be movable in the Z-axis direction. The drive of servo motors 55a, 155a of the third and fourth Z-axis direction telescopic actuators 55, 155 is controlled by the unillustrated controller. Specifically, the servo motors 55a, 155a are connected to the controller, and the third and fourth rail moving mechanisms 53, 153 are configured to be able to lift and lower the third and fourth short rails 52, 152 in the Z-axis direction together with the third and fourth supporting plates 54, 154 by driving the servo motors 55a, 155a by a command from the controller.

When the third and fourth short rails 52, 152 are connected to the first to fourth guide rails 21, 22, 121, 122, the pallets 11 moving on the first to fourth guide rails 21, 22, 121, 122 can move from the first to fourth guide rails 21, 22, 121, 122 to the third and fourth short rails 52, 152. To this end, the third and fourth pallet moving parts 51, 151 respectively include third and fourth pallet locking mechanisms 56, 156 for limiting movements of the pallets 11 mounted on the third and fourth short rails 52, 152.

The third and fourth pallet locking mechanisms 56, 156 are configured to be engageable with the pallets 11 mounted on the third and fourth short rails 52, 152 and respectively include endless third and fourth auxiliary belts 57, 157 configured to circulate along the third and fourth short rails 52, 152 and third and fourth auxiliary circulating mechanisms for circulating the third and fourth auxiliary belts 57, 157.

Auxiliary pulleys 58, 158 on which the third and fourth auxiliary belts 57, 157 extending along the third and fourth short rails 52, 152 are respectively mounted are rotatably supported on one end parts of the third and fourth supporting plates 54, 154 in the X-axis direction. Further, auxiliary drive pulleys 59, 159 on which the third and fourth auxiliary belts 57, 157 are respectively mounted are rotatably supported on the other end parts of the third and fourth supporting plates 54, 154 in the X-axis direction.

The third and fourth auxiliary circulating mechanisms are composed of servo motors 60, 160 mounted on the third and fourth supporting plates 54, 154. The auxiliary drive pulleys 59, 159 are mounted on rotary shafts 60a, 160a of the servo motors 60, 160. The auxiliary drive pulleys 59, 159 are provided on the same plane as the auxiliary pulleys 58, 158 and the third and fourth auxiliary belts 57, 157 are respectively mounted on the auxiliary drive pulleys 59, 159 and the auxiliary pulleys 58, 158.

When the servo motors 60, 160 are driven by a command from the unillustrated controller, the third and fourth auxiliary belts 57, 157 are respectively circulated along the third and fourth short rails 52, 152 via the auxiliary drive pulleys 59, 159 and the auxiliary pulleys 58, 158.

As shown in FIG. 10, the third and fourth auxiliary belts 57, 157 are belts in which recesses and projections 57a, 57b, 157a, 157b having the same shapes as in the first and second circulation belts 32, 132 and extending in the width direction are alternately connected in a longitudinal direction. The third and fourth auxiliary belts 57, 157 are configured such that the recesses and projections 57a, 57b, 157a, 157b thereof are engageable with the projections and recesses 14a, 14b formed on the second locking members 14 provided on the side surfaces (side edges) of the pedestals 13 of the pallets 11 when the pallets 11 are mounted on the third and fourth short rails 52, 152.

Specifically, one principal surfaces of the third and fourth auxiliary pulleys 57, 157 provided with the recesses and projections 57a, 57b, 157a, 157b and one principal surfaces of the first and second circulation belts 32, 132 provided with the recesses and projections 32a, 32b, 132a, 132b differ in orientation, and these principal surfaces are orientated perpendicular to each other to be at right angles to each other.

It should be noted that the one principal surfaces of the third and fourth auxiliary belts 57, 157 of the third and fourth pallet moving parts 51, 152 provided with the recesses and projections 57a, 57b, 157a, 157b are also oriented perpendicular to the one principal surfaces of the first and second auxiliary pulleys 47, 147 of the first and second pallet moving parts 41, 141 provided with the projections and recesses 14a, 14b, 147a, 147b. Thus, although not shown, the first and second pallet moving parts 41, 141 and the third and fourth pallet moving parts 51, 151 can be arranged adjacent to each other.

Further, principal surfaces of fifth and sixth auxiliary belts 67, 167 of the later-described fifth pallet moving parts 61, 161 provided with recesses and projections 67a, 67b, 167a, 167b are substantially on the same planes as the one principal surfaces of the third and fourth auxiliary belts 57, 157 of the third and fourth pallet moving parts 51, 151 provided with the recesses and projections 57a, 57b, 157a, 157b.

In this way, a plurality of sets of the first and second pallet moving parts 41, 141, the third and fourth pallet moving parts 51, 151, the fifth pallet moving parts 61, 161 and the first to fourth guide rails 21, 22, 121 and 122 can be arranged adjacent to each other if necessary. Thus, various pallet conveying apparatuses and conveyance modes can be constructed according to the number of machine tools, a work processing process, a processing sequence, a pallet return timing or the like.

Here, with the pallet 11 located on a boundary between the first to fourth guide rail 21, 22, 121, 122 and the third or fourth short rail 52, 152 as shown as an example in an upper part of FIG. 10, the first or second circulation belt 32, 132 is locked to the first locking members 14 provided on the lower side of the pallet 11 and the second locking members 14 provided on the side surface (side edge) of the pedestal 13 of the pallet 11 are locked to the third or fourth auxiliary belt 57, 157.

Accordingly, if the first and second circulation belts 32, 132 and the third and fourth auxiliary belts 57, 157 are circulated at the same speed, the pallets 11 moving on the first to fourth guide rails 21, 22, 121, 122 move to the third and fourth short rails 52, 152 connected to the first to fourth guide rails 21, 22, 121, 122. Further, if the first and second circulation belts 32, 132 and the third and fourth auxiliary belts 57, 157 are circulated at the same speed in opposite directions, the pallets 11 moving on the third and fourth short rails 52, 152 move from the third and fourth short rails 52, 152 to the first to fourth guide rails 21, 22, 121, 122.

The fifth pallet moving parts 61, 161 provided via the third and fourth pallet moving parts 51, 151 at the other end parts of the first to fourth guide rail 21, 22, 121 and 122 horizontally move the pallet 11 between the first and third guide rails 21, 121 provided at a predetermined interval in the Y-axis direction. Further, the fifth pallet moving parts 61, 161 similarly horizontally move the pallet 11 between the second and fourth guide rails 22, 122 provided at a predetermined interval in the Y-axis direction.

Figure 9:
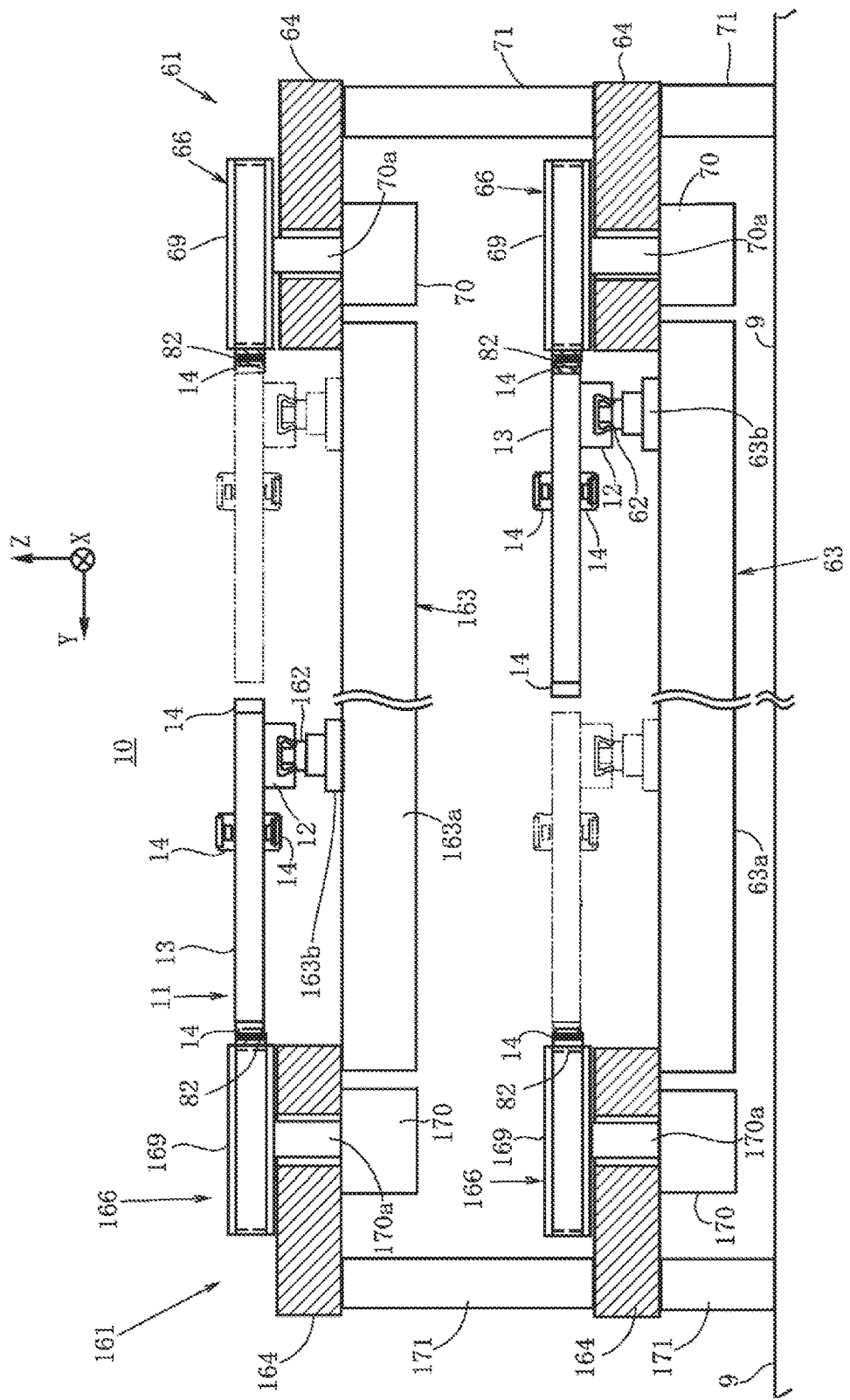
FIG. 9 is a sectional view along line H-H of FIG. 1.

As shown in FIG. 9, the fifth pallet moving parts 61, 161 in the present embodiment include fifth and sixth short rails 62, 162 configured such that the pallet 11 is mountable thereon, fifth and sixth rail moving mechanisms 63, 163 for parallelly moving the fifth and sixth short rails 62, 162 from a fifth position on one side to a six position on the other side, and third pallet locking mechanisms 66, 166 for limiting movements of the pallets 11 mounted on the fifth and sixth short rails 62, 162. The fifth position is a position connected to the linear motion guide rail 21c, 22c of the first or second guide rail 21, 22. Further, the sixth position is a position connected to the linear motion guide rail 121c, 122c of the third or fourth guide rail 121, 122. The fifth and sixth short rails 62, 162 have the same structure as the first to fourth short rails 42, 52, 142 and 152 of the first to fourth pallet moving parts 41, 51, 141 and 151.

The third pallet locking mechanisms 66, 166 have the same structure as the third and fourth pallet locking mechanisms 56, 156 and include endless fifth and sixth auxiliary belts 67, 167 provided on the fifth and sixth supporting plates 64, 164 and configured to circulate, and fifth and sixth auxiliary circulating mechanisms for circulating these fifth and sixth auxiliary belts 67, 167.

In the present embodiment, four fifth and sixth supporting plates 64, 164 are mounted on the mount 9 via supporting columns 71, 171. Out of those, two fifth supporting plates 64 are mounted via the supporting column 71 at positions where the sixth auxiliary belt 67 is locked to the second locking members 14 provided on the side edge of the pallet 11 when the pallet 11 moves to an extension of the first or second guide rail 21, 22 located on the one side.

Further, the other two sixth supporting plates 164 are mounted via the supporting column 171 at positions where the sixth auxiliary belt 167 is locked to the second locking members 14 provided on the other side edge of the pallet 11 when the pallet 11 moves to an extension of the third or fourth guide rail 121, 122.

As shown in FIGS. 9 and 10, auxiliary pulleys 68, 168 on which the fifth and sixth auxiliary belts 67, 167 are respectively mounted are rotatably supported on one end part of each of the four fifth and sixth supporting plates 64, 164 in the X-axis direction, and auxiliary drive pulleys 69, 169 on which the fifth and sixth auxiliary belts 67, 167 are respectively mounted are rotatably supported on the other end parts of the fifth and sixth supporting plates 64, 164 in the X-axis direction.

The fifth and sixth auxiliary circulating mechanisms are servo motors 70, 170 respectively mounted on the fifth and sixth supporting plates 64, 164. The auxiliary drive pulleys 69, 169 are respectively mounted on rotary shaft 70a, 170a of the servo motors 70, 170.

The auxiliary drive pulleys 69, 169 are provided on the same planes as the auxiliary pulleys 68, 168 and the fifth and sixth auxiliary belts 67, 167 are respectively mounted on the auxiliary drive pulleys 69, 169 and the auxiliary pulleys 68, 168.

When the servo motors 70, 170 are driven by a command from the unillustrated controller, the fifth and sixth auxiliary belts 67, 167 are circulated via the auxiliary drive pulleys 69, 169 and the auxiliary pulleys 68, 168.

As shown in FIG. 10, the fifth and sixth supporting plates 64, 164 are mounted on the mount 9 via the supporting columns 71, 171 such that the fifth and sixth auxiliary belts 67, 167 are circulated along the fifth and sixth short rails 62, 162 when the fifth and sixth short rails 62, 162 are present on extensions of the linear motion guide rails 21c, 22c, 121c, 122c of the first to fourth guide rails 21, 22, 121, 122.

When the fifth and sixth short rails 62, 162 are connected to the linear motion guide rails 21c, 22c, 121c, 122c of the first to fourth guide rails 21, 22, 121, 122 via the third and fourth short rails 52, 152, the pallets 11 moving from the linear motion guide rails 21c, 22c, 121c, 122c via the third and fourth short rails 52, 152 are mounted on the fifth and sixth short rails 62, 162. Further, the fifth and sixth short rails 62, 162 are configured such that the pallets 11 mounted on the fifth and sixth short rails 62, 162 are movable to the linear motion guide rails 21, 22c, 121c, 122c via the third and fourth short rails 52, 152.

Further, the fifth and sixth auxiliary belt 67, 167 are belts in which recesses and projections 67a, 67b, 167a, 167b having the same shapes as in the first and second circulation belts 32, 132 and extending in the width direction are alternately connected in a longitudinal direction. The fifth and sixth auxiliary belts 67, 167 are configured such that the recesses and projections 67a, 67b, 167a, 167b are engageable with the projections and recesses 14a, 14b formed on the second locking members 14 provided on one or the other side edges of the pallets 11 when the pallets 11 are mounted on the fifth and sixth short rails 62, 162 connected to the linear motion guide rails 21c, 22c, 121c, 122c via the third and fourth short rails 52, 152.

Accordingly, when the first and second circulation belts 32, 132, the third and fourth auxiliary belts 57, 157 and the fifth and sixth auxiliary belts 67, 167 shown in FIG. 10 are circulated at the same speed, the pallets 11 moving on the first to fourth guide rails 21, 22, 121, 122 are movable up to the fifth and sixth short rails 62, 162 via the third and fourth short rails 52, 52 connected to the first to fourth guide rails 21, 22, 121, 122. Further, the pallets 11 mounted on the fifth and sixth short rails 62, 162 are moved from the fifth and sixth short rails 62, 162 to the first to fourth guide rails 21, 22, 121, 122 via the third and fourth short rails 52, 152.

As shown in FIG. 9, the fifth and sixth rail moving mechanisms 63, 163 for moving such fifth and sixth short rails 62, 162 in the horizontal direction are composed of fluid pressure cylinders 63, 163 disposed between the fifth and sixth supporting plates 64, 164 separated in the Y-axis direction. The fluid pressure cylinders 63, 163 respectively include body portions 63a, 163a actually disposed between the fifth and sixth supporting plates 64, 164 separated in the Y-axis direction and sliders 63b, 163b provided atop those body portions 63a, 163a and movable in the longitudinal direction by a fluid pressure.

In the present embodiment, the fifth and sixth short rails 62, 162 are provided on the sliders 63b, 163b. The sliders 63b, 163b are configured to move in the Y-axis direction together with the fifth and sixth short rails 62, 162 by an inflow pressure of fluid in response to a command from the unillustrated controller.

When the fifth and sixth short rails 62, 162 are connected to the first or second guide rail 21, 22, the projections and recesses 14a, 14b of the second locking members 14 provided on one side edges of the pallets 11 mounted on the fifth and sixth short rails 62, 162 are engaged with the recesses and projections 67a, 67b of the fifth auxiliary belts 67 of the fifth pallet moving part 61 on one side. In this way, the pallets 11 are locked to the fifth pallet moving part 61.

When the fifth and sixth short rails 62, 162 move toward positions connected to the third or fourth guide rails 121, 122 on the other side, the engaged projections and recesses 14a, 14b of the second locking members 14 of the pallets 11 are separated from the recesses and projections 67a, 67b of the fifth auxiliary belts 67 of the fifth pallet moving part 61 on the one side, whereby the locking thereof is released.

Thereafter, when the fifth and sixth short rails 62, 162 reach positions to be connected to the third or fourth guide rail 121, 122, the projections and recesses 14a, 14b of the second locking members 14 provided on the other side edges of the pallets 11 are engaged with the recesses and projections 167a, 167b of the sixth auxiliary belts 167 of the fifth pallet moving part 161 on the other side, whereby the pallets 11 are locked to the fifth pallet moving part 161.

Next, a conveying method of the pallet 11 using the pallet conveying apparatus 10 of the present embodiment is described. The conveying method of the pallet 11 using the pallet conveying apparatus 10 includes first to fourth pallet conveying steps classified below.

(1) First Pallet Conveying Step

This step is a pallet conveying step of conveying the pallet 11 mounted on the first guide rail 21 located above on one side along the first guide rail 21.

(2) Second Pallet Conveying Step

This step is a pallet conveying step of moving the pallet 11 having reached an end part of the first guide rail 21 located above on the one side toward the second guide rail 22 located below and returning the pallet 11 along the second guide rail 22.

(3) Third Pallet Conveying Step

This step is a pallet conveying step of moving the pallet 11 returned via the second guide rail 22 located below on the one side to the third guide rail 121 located above on the other side, mounting the pallet 11 on the third guide rail 121 and conveying the mounted pallet 11 along the third guide rail 121.

(4) Fourth Pallet Conveying Step

This step is a pallet conveying step of moving the pallet 11 having reached an end part of the third guide rail 121 located above on the other side toward the fourth guide rail 122 located below and returning the pallet 11 along the fourth guide rail 122.

Next, each of the steps (1) to (4) described above is described in detail below.

(1) First Pallet Conveying Step

In this step, the pallet 11 mounted on the first guide rail 21 is conveyed toward the machine tools 1 to 3. Here, the pallet 11 carries a work to which predetermined processings are to be applied. The work may be mounted on the pallet 11 mounted on the first guide rail 21 or the pallet 11 having the work mounted thereon in advance may be mounted on the first guide rail 21.

Since the mounting tool 16 for mounting the work is provided on the pallet 11 in the present embodiment (see FIG. 5), the work is mounted on the pallet 11 via this mounting tool 16.

Further, the pallet 11 is mounted on the first guide rail 21 by mounting the linear motion block 12 of the pallet 11 on an end part of the first linear motion guide rail 21c of the first guide rail 21 on the side of the first or third pallet moving part 41, 51.

When the pallet 11 is mounted on the first guide rail 21 in this way as shown in FIGS. 1 and 3, the projections and recesses 14a, 14b provided on the pallet 11 are engaged with the recesses and projections 32a, 32b of the first circulation belt 32 provided along the first guide rail 21. Thus, the pallet 11 can be conveyed along the first guide rail 21 by driving the servo motor 33, which is a drive mechanism, thereafter to circulate the first circulation belt 32 by.

The pallet 11 on the first guide rail 21 is conveyed until coming to face each machine tool 1 to 3 (see FIG. 1) in the first pallet conveying step. When the pallet 11 faces each machine tool 1 to 3, the servo motor 33 is stopped. Thereafter, the predetermined processing is applied to the work mounted on the pallet 11 at each machine tool 1 to 3. When all the processings of the machine tools 1 to 3 are finished, the pallet 11 is conveyed to the one end part of the first guide rail 21, whereby this first pallet conveying step is finished.

(2) Second Pallet Conveying Step

In this step, the pallet 11 having reached the one end part of the first guide rail 21 is moved to the second guide rail 22 and returned via that second guide rail 22. The pallet 11 is vertically moved by the first pallet moving part 41.

A specific procedure of this step is to first mount the pallet 11 having reached the one end part of the first guide rail 21 on the first short rail 42 of the first pallet moving part 41 (see FIG. 1) and move the pallet 11 to the position of the first supporting plate 44 shown by dashed-dotted line of FIG. 3.

When the pallet 11 is mounted on the first short rail 42, the first short rail 42 is lifted and moved to the first position by the first Z-axis direction telescopic actuator 45, thereby connecting the first short rail 42 to the first guide rail 21. Subsequently, in that state, the first circulation belt 32 and the first auxiliary belt 47 are circulated at the same speed. In this way, the pallet 11 moving on the first guide rail 21 is moved to the first short rail 42 connected to the first guide rail 21.

In a state where the pallet 11 is mounted on the first short rail 42, the drive of the servo motor 50 is stopped and the circulation of at least the first auxiliary belt 47 is stopped, thereby maintaining the state where the pallet 11 is mounted on the first short rail 42.

In the present embodiment, since the circulation of the first circulation belt 32 and that of the first auxiliary belt 47 are separately controlled as just described, the first circulation belt 32 can be circulated even in the state where the pallet 11 is mounted on the first short rail 42. Thus, the pallet 11 on the first guide rail 21 can be conveyed regardless of whether or not the pallet 11 is mounted on the first short rail 42.

Subsequently, the second supporting plate 44 is lowered together with the pallet 11 mounted on the first short rail 42 as shown by a broken-line arrow of FIG. 3, thereby moving the first short rail 42 having the pallet 11 mounted thereon from the first position to the second position shown by solid line. This movement is made by the first Z-axis direction telescopic actuator 45.

Subsequently, the first auxiliary belt 47 is circulated in a reverse direction and the first circulation belt 32 is circulated again, whereby the pallet 11 mounted on the first short rail 42 is moved from the short rail 42 to the second guide rail 22 provided along the first circulation belt 32.

When the pallet 11 is moved to one end part of the second guide rail 22 and mounted thereon, the first locking members 14 provided on the upper part of the pallet 11 are newly engaged with the first circulation belt 32 provided along the second guide rail 22 as shown in the enlarged view of FIG. 3. If the first circulation belt 32 is circulated by driving the servo motor 33 in this state, the pallet 11 can be conveyed in the reverse direction (toward the other end part of the second guide rail 22) along the second guide rail 22.

Here, an upper part of the first guide rail 21 is on the same side as one principal surface of the first circulation belt 32 provided with the recesses and projections 32a, 32b and an upper part of the second guide rail 22 is on a side opposite to the principal surface of the first circulation belt 32 provided with the recesses and projections 32a, 32b. Thus, the pallets 11 respectively mounted on the first and second guide rails 21, 22 can be locked to the single first circulation belt 32. By circulating the single first circulation belt 32 in that state, the pallets 11 respectively mounted on the first and second guide rails 21, 22 can be simultaneously moved in different directions.

By setting the first and second guide rails 21, 22 in a vertically parallel positional relationship as shown in FIG. 3, it is possible to convey the pallet 11 mounted on the first guide rail 21 in one direction and convey the pallet 11 mounted on the second guide rail 22 in the reverse direction. In this way, the pallet 11 can be returned to the one end side where the pallet 11 was mounted.

As just described, according to the pallet conveying apparatus of the present embodiment, a separately provided circulation belt conventionally required to return the pallet 11 is unnecessary. In this way, the number of components can be reduced as compared to conventional conveying apparatuses separately requiring a circulation belt for returning the pallet 11.

Thus, according to the pallet conveying apparatus of the present embodiment, it is possible to prevent the manufacturing cost (unit price) of the pallet conveying apparatus 10 from being pushed up due to an increase in the number of components and miniaturize the pallet conveying apparatus 10.

(3) Third Pallet Conveying Step

In this step, the pallet 11 returned via the second guide rail 22 is moved to and mounted on the third guide rail 12 and conveyed toward the machine tools 4 to 6 along the third guide rail 121. The pallet 11 is moved by the third to fifth pallet moving parts 51, 61 and 151.

A specific procedure of this step is to first mount the pallet 11 having reached the other end part of the second guide rail 22 to the fifth short rail 62 of the fifth pallet moving part 61 via the third short rail 52 of the third pallet moving part 51.

In moving the pallet 11 to the third short rail 52, the third short rail 52 is lowered and moved to the fourth position by the third Z-axis direction telescopic actuator 55 and connected to the second guide rail 22 as shown in FIG. 3. Subsequently, in that state, the first circulation belt 32 and the third auxiliary belt 57 are circulated at the same speed. In this way, the pallet 11 moving on the second guide rail 22 is moved to the third short rail 52 connected to the second guide rail 22.

When the pallet 11 is subsequently moved from the third short rail 52 to the fifth short rail 62, the slider 63b of the fluid pressure cylinder 63 is moved to the position connected to the third short rail 52 and the fifth short rail 62 is connected to the third short rail 52. Subsequently, in that state, the third auxiliary belt 57 and the fifth auxiliary belt 67 are circulated at the same speed (see FIGS. 9 and 10). In this way, the pallet 11 moved from the second guide rail 22 to the third short rail 52 passes through the third short rail 52 and is moved to the fifth short rail 62 (see FIG. 3).

If the pallet 11 horizontally moves to the fifth short rail 62 connected to the second guide rail 22 via the third short rail 52, the drive of the servo motor 70 is stopped and the circulation of at least the fifth auxiliary belt 67 is stopped (FIGS. 9 and 10) with the pallet 11 mounted on the fifth short rail 62, thereby maintaining a state where the pallet 11 is mounted on the fifth short rail 62.

Subsequently, the slider 63b is moved in the Y-axis direction together with the pallet 11 mounted on the fifth short rail 62 as shown by solid line of FIG. 9, thereby moving the fifth short rail 62 having the pallet 11 mounted thereon to a position connected to the fourth guide rail 122. This movement is made by supplying and discharging the fluid to and from the fluid pressure cylinder 63.

When the fifth short rail 62 is moved to the position connected to the fourth guide rail 122, the sixth auxiliary belt 167 of the third pallet locking mechanism 166 is engaged with the second locking members 14 provided on the other side edge of the pallet 11 and the pallet 11 is locked as shown by dashed-dotted line of FIG. 9.

Subsequently, as shown by broken line of FIG. 2, the fourth short rail 152 is lowered by the fourth Z-axis direction telescopic actuator 155 of the fourth pallet moving part 151 and moved to the fourth position and the fourth short rail 152 is connected to the fourth guide rail 122.

Subsequently, in that state, the sixth auxiliary belt 167 and the fourth auxiliary belt 157 are circulated at the same speed in the same direction (see FIG. 10). In this way, the pallet 11 mounted on the fifth short rail 62 is moved to the fourth short rail 152. With the pallet 11 mounted on the fourth short rail 52, the drive of the servo motor 160 is stopped and the circulation of at least the fourth auxiliary belt 157 is stopped, thereby maintaining a state where the pallet 11 is mounted on the fourth short rail 152.

Subsequently, the fourth short rail 152 having the pallet 11 mounted thereon is lifted by the fourth Z-axis direction telescopic actuator 155 as shown by a solid-line arrow of FIG. 2 and the fourth short rail 152 is moved to the fourth position connected to the third guide rail 121 as shown by solid line of FIG. 2.

Subsequently, with the pallet 11 mounted on the fourth short rail 152, the fourth auxiliary belt 157 and the second circulation belt 132 are circulated and the pallet 11 mounted on the fourth short rail 152 is moved from the fourth short rail 152 to the third guide rail 121 extending along the second circulation belt 132 and located above on the other side.

When the pallet 11 is moved to and mounted on the third guide rail 121, the first locking members 14 provided on the lower part of the pallet 11 are newly engaged with the second circulation belt 132 provided along the third guide rail 121 as shown in the enlarged view of FIG. 2. Thus, by driving the servo motor 133, which is a drive mechanism, to circulate the second circulation belt 132, the pallet 11 can be conveyed along the third guide rail 121.

In this third pallet conveying step, the pallet 11 on the third guide rail 121 is conveyed until facing each machine tool 4 to 6 (see FIG. 1). When the pallet 11 faces each machine tool 4 to 6, the servo motor 133 is stopped. Thereafter, a predetermined processing is applied to the work mounted on the pallet 11 at each machine tool 4 to 6. When all the processings of the machine tools 4 to 6 are finished, the pallet 11 is conveyed to one end part of the third guide rail 121 and this third pallet conveying step is finished.

(4) Fourth Pallet Conveying Step

In this step, the pallet 11 having reached the one end part of the third guide rail 121 is moved to the fourth guide rail 122 and returned via that fourth guide rail 122. The pallet 11 is vertically moved by the second pallet moving part 141.

Since a lowering movement of the pallet 11 by the second pallet moving part 141 is the same as that of the pallet 11 by the first pallet moving part 41 in the second pallet conveying step described above, repeated description is omitted and specific means thereafter is described below.

When the pallet 11 is moved to the fourth guide rail 122 located below by the second pallet moving part 141 and mounted on one end part of the fourth guide rail 122, the locking members 14 provided on the upper part of the pallet 11 are newly engaged with the second circulation belt 132 provided along the fourth guide rail 122 as shown in the enlarged view of FIG. 2. When the second circulation belt 132 is circulated by driving the servo motor 133 in this state, the pallet 11 can be conveyed in the reverse direction (toward the other end part of the fourth guide rail 122) along the fourth guide rail 122.

Here, an upper part of the third guide rail 121 is on the same side as one principal surface of the second circulation belt 132 provided with the recesses and projections 132a, 132b and an upper part of the fourth guide rail 122 is on a side opposite to the principal surface of the second circulation belt 132 provided with the recesses and projections 132a, 132b. Thus, the pallets 11 respectively mounted on the third and fourth guide rails 121, 122 can be locked to the single second circulation belt 132. By circulating the single second circulation belt 132 in that state, the pallets 11 respectively mounted on the third and fourth guide rails 121, 122 can be simultaneously moved in different directions.

By setting the third and fourth guide rails 121, 122 in a vertically parallel positional relationship as shown in FIG. 2, it is possible to convey the pallet 11 mounted on the third guide rail 121 in one direction and convey the pallet 11 mounted on the fourth guide rail 122 in the reverse direction. This eliminates the need for a separately provided circulation belt conventionally required to return the pallet 11.

In this way, the number of components can be reduced as compared to conventional conveying apparatuses separately requiring a circulation belt for returning the pallet 11. Thus, according to the pallet conveying apparatus 10 of the present embodiment, it is possible to prevent the manufacturing cost (unit price) of the pallet conveying apparatus 10 from being pushed up due to an increase in the number of components and miniaturize the pallet conveying apparatus 10.

Further, in the pallet conveying apparatus 10 of the present embodiment, the pallets 11 are conveyed along the first or third guide rail 21, 121 and the second or fourth guide rail 22, 122 by engaging the pallets 11 with the endless first or second circulation belt 32, 132 configured to circulate. Thus, by appropriately adjusting the positions of the pallets 11 engaged with the first or second circulation belt 32, 132, an interval to the preceding pallet 11 already engaged with the first or second circulation belt 32, 132 and conveyed along the first to fourth guide rail 21, 22, 121, 122, i.e. a conveying pitch between the pallets 11 can be easily changed.

Accordingly, even if a work conveying pitch needs to be changed due to a change of each machine tool 1 to 6 (see FIG. 1), objects to be processed or the like, such a change can be dealt with by the same pallet conveying apparatus 10 by quickly changing the pitch between the pallets 11 without changing the pallets 11 themselves.

It should be noted that, in the description of "(3) Third Pallet Conveying Step" in the embodiment described above, a case has been described in which the pallet 11 returned via the second guide rail 22 is conveyed as follows in being moved to and mounted on the third guide rail 121. Specifically, after the pallet 11 having reached the end part of the second guide rail 22 is mounted on the fifth short rail 62 of the adjacent fifth pallet moving part 61 via the third short rail 52 of the third pallet moving part 51 and the fifth short rail 62 is moved in the Y-axis direction, the pallet 11 is mounted on the fourth short rail 152 of the fourth pallet moving part 151 again and the fourth short rail 152 is lifted and connected to the third guide rail 121.

However, the pallet 11 having reached the other end part of the second guide rail 22 may be mounted on the third short rail 52 of the third pallet moving part 51, the third short rail 52 may be lifted as shown by a solid-line arrow of FIG. 8, the pallet 11 may be, thereafter, moved to and mounted on the sixth short rail 162 of the adjacent fifth pallet moving part 61 from the third short rail 52, the sixth short rail 162 may be horizontally moved in the Y-axis direction as shown by broken line of FIG. 9 and connected to the third guide rail 121 via the fourth short rail 152 and, further, the pallet 11 may be moved to and mounted on the other end part of the third guide rail 121 via the fourth short rail 152 from the sixth short rail 162.

Further, in the pallet conveying apparatus 10 of the present embodiment, the first and second pallet moving parts 41, 141 are provided at the end parts on one side (one end parts) of the first or third guide rail 21, 121 and the second or fourth guide rail 22, 122 and the third and fourth pallet moving parts 51, 151 and the fifth pallet moving parts 61, 161 adjacent to the third and fourth pallet moving parts 51, 151 are provided at the end parts on the other side (other end parts). The pallet conveying method using this pallet conveying apparatus 10 is described in detail for "(1) First Pallet Conveying Step" to "(4) Fourth Pallet Conveying Step".

However, the pallet conveying apparatus 10 can be configured using a plurality of sets of guide rails 21, 22, each set being composed of the first guide rail 21 and the second guide rail 22. Alternatively, the first and second pallet moving parts 41, 141, the third and fifth pallet moving parts 51, 61 or the third and fifth pallet moving parts 151, 161 or a combination of these can be added at end parts of the plurality of sets of guide rails or between the plurality of sets of guide rails.

Specifically, the pallet conveying apparatus 10 of the present invention can construct the configuration and conveying mode of the pallet conveying apparatus according to the number of the machine tools, the processing steps and sequence of the works, the pallet returning timing or the like.

Further, a case where the mounting tool 16 is provided on the pedestal 13 in the form of a flat plate has been described in the above embodiment. However, this mounting tool 16 may be provided on each of both surfaces of the pedestal 13 if necessary. Further, the pedestal 13 may be formed with a through hole and a mounting tool corresponding to that through hole may be provided. By employing such a configuration, the work can be mounted through the pedestal 13 via the through hole and the work can be processed from both upper and lower sides depending on the configurations of the machine tools.

This application claims priority based on Japanese Patent Application No. 2015-27207 filed with the Japan Patent Office on Feb. 16, 2015, the entire contents of which are incorporated into this specification.

The invention claimed is:

1. A pallet conveying apparatus, comprising:
a first and a second guide rails separated in a vertical direction, the first and second guide rails being configured such that a pallet is movably mountable thereon;
an endless first circulation belt provided along the first and second guide rails, recesses and projections engageable with the pallet being formed on one principal surface of the first circulation belt;
a first pallet feeding part configured to convey the pallet by rotating the first circulation belt engaged with the pallet;
a first pallet moving part provided at one end sides of the first and second guide rails, the first pallet moving part moving the pallet from one of the first and second guide rails to the other;
a third and a fourth guide rail separated in the vertical direction to be respectively on the same planes as the first and second guide rails, the third and fourth guide rails being configured such that the pallet is movably mountable thereon;
an endless second circulation belt provided along the third and fourth guide rails, recesses and projections engageable with the pallet being formed on one principal surface of the second circulation belt;
a second pallet feeding part configured to convey the pallet by rotating the second circulation belt engaged with the pallet; and
a second pallet moving part provided at one end sides of the third and fourth guide rails, the second pallet moving part moving the pallet from one guide rail to the other; and
a fifth pallet moving part configured to horizontally move the pallet between the first or second guide rail and the third or fourth guide rail, wherein:
the pallet is engaged with an upper side of the first circulation belt when moving along the first guide rail provided on a vertically upper side while being engaged with a lower side of the first circulation belt when moving along the second guide rail provided on a vertical lower side; and
the pallet is engaged with an upper side of the second circulation belt when moving along the third guide rail provided on the vertically upper side while being engaged with a lower side of the second circulation belt when moving along the fourth guide rail provided on the vertical lower side.

2. The pallet conveying apparatus according to claim 1, wherein:
the first guide rail is provided in parallel to the third guide rail, and the second guide rail is provided in parallel to the fourth guide rail.

3. The pallet conveying apparatus according to claim 1, wherein:
the first pallet moving part is configured to lift and lower the pallet between the first guide rail located on the vertically upper side and the second guide rail located on the vertically lower side; and
the first pallet moving part includes:
a first short rail configured such that the pallet is mountable thereon; and
an endless first auxiliary belt provided along the first short rail, recesses and projections engageable with the pallet being formed on one principal surface of the first auxiliary belt.

4. The pallet conveying apparatus according to claim 1, wherein:
the second pallet moving part is configured to lift and lower the pallet between the third guide rail located on the vertically upper side and the fourth guide rail located on the vertically lower side; and
the second pallet moving part includes:
a second short rail configured such that the pallet is mountable thereon; and
an endless second auxiliary belt provided along the second short rail, recesses and projections engageable with the pallet being formed on one principal surface of the second auxiliary belt.

5. The pallet conveying apparatus according to claim 1, further comprising a third pallet moving part provided at the other end sides of the first and second guide rails, the third pallet moving part being configured to lift and lower the pallet between the first guide rail located on the vertically upper side and the second guide rail located on the vertically lower side, wherein:
the third pallet moving part includes:
a third short rail configured such that the pallet is mountable thereon; and
an endless third auxiliary belt provided along the third short rail, recesses and projections engageable with the pallet being formed on one principal surface of the third auxiliary belt; and
the one principal surface of the third auxiliary belt provided with the recesses and projections and extending along the third short rail is at a right angle to the one principal surface of the corresponding first circulation belt provided with the recesses and projections and extending along the first guide rail.

6. The pallet conveying apparatus according to claim 1, further comprising a fourth pallet moving part provided at the other end sides of the third and fourth guide rails, the fourth pallet moving part being configured to lift and lower the pallet between the third guide rail located on the vertically upper side and the fourth guide rail located on the vertically lower side, wherein:
the fourth pallet moving part includes:
a fourth short rail configured such that the pallet is mountable thereon; and
an endless fourth auxiliary belt provided along the fourth short rail, recesses and projections engageable with the pallet being formed on one principal surface of the fourth auxiliary belt; and
the one principal surface of the fourth auxiliary belt provided with the recesses and projections and extending along the fourth short rail is at a right angle to the one principal surface of the corresponding second circulation belt provided with the recesses and projections and extending along the second guide rail.

7. The pallet conveying apparatus according to claim 1, further comprising:
a third pallet moving part provided at the other end sides of the first and second guide rails, the third pallet moving part being configured to lift and lower the pallet between the first guide rail located on the vertically upper side and the second guide rail located on the vertically lower side; and
a fourth pallet moving part provided at the other end sides of the third and fourth guide rails, the fourth pallet moving part being configured to lift and lower the pallet between the third guide rail located on the vertically upper side and the fourth guide rail located on the vertically lower side, wherein:
the third pallet moving part includes:
a third short rail configured such that the pallet is mountable thereon; and
an endless third auxiliary belt provided along the third short rail, recesses and projections engageable with the pallet being formed on one principal surface of the third auxiliary belt;
the fourth pallet moving part includes:
a fourth short rail configured such that the pallet is mountable thereon; and
an endless fourth auxiliary belt provided along the fourth short rail, recesses and projections engageable with the pallet being formed on one principal surface of the fourth auxiliary belt;
the one principal surface of the third auxiliary belt provided with the recesses and projections and extending along the third short rail is at a right angle to the one principal surface of the corresponding first auxiliary belt provided with the recesses and projections and extending along the first guide rail; and
the one principal surface of the fourth auxiliary belt provided with the recesses and projections and extending along the fourth short rail is at a right angle to the one principal surface of the corresponding second auxiliary belt provided with the recesses and projections and extending along the second guide rail.

8. The pallet conveying apparatus according to claim 7, wherein:
the fifth pallet moving part includes:
a fifth short rail adjacent to the third short rail, the fifth short rail being configured such that the pallet is mountable thereon;
an endless fifth auxiliary belt provided along the fifth short rail, recesses and projections engageable with the pallet being formed on one principal surface of the fifth auxiliary belt;

a sixth short rail adjacent to the fourth short rail, the sixth short rail being configured such that the pallet is mountable thereon; and
an endless sixth auxiliary belt provided along the sixth short rail, recesses and projections engageable with the pallet being formed on one principal surface of the sixth auxiliary belt;
the one principal surface of the fifth auxiliary belt provided with the recesses and projections and extending along the fifth short rail is substantially on the same plane as the one principal surface of the corresponding third auxiliary belt provided with the recesses and projections and extending along the third short rail; and
the one principal surface of the sixth auxiliary belt provided with the recesses and projections and extending along the sixth short rail is substantially on the same plane as the one principal surface of the corresponding fourth auxiliary belt provided with the recesses and projections and extending along the fourth short rail.

9. The pallet conveying apparatus according to claim 1, wherein:
the pallet includes:
a pedestal in the form of a flat plate composed of front and back principal surfaces and a plurality of side surfaces, a work being mounted on the front and back principal surfaces; and
a locking member including projections and recesses engageable with the recesses and projections of the first or second circulation belt; and
the locking member is provided on at least each of the both principal surfaces of the pedestal.

10. The pallet conveying apparatus according to claim 7, wherein:
the pallet includes:
a pedestal in the form of a flat plate composed of front and back principal surfaces and a plurality of side surfaces, a work being mounted on the front and back principal surfaces;
a first locking member including projections and recesses engageable with the recesses and projections of the first circulation belt, the second circulation belt, the first auxiliary belt or the second auxiliary belt; and
a second locking member including projections and recesses engageable with the recesses and projections of the third, fourth, fifth or sixth auxiliary belt; and
the first locking member is provided on each of the both principal surfaces of the pedestal and the second locking member is provided on the side surface of the pedestal.

* * * * *